Aug. 30, 1966 H. D. SHORT 3,270,123

BUNDLE CONDUCTOR SYSTEM WITH IMPROVED SPACER

Filed June 18, 1964

INVENTOR.
H. DOUGLASS SHORT
BY Fetherstonhaugh & Co.
ATTORNEYS

United States Patent Office 3,270,123

Patented August 30, 1966

3,270,123

BUNDLE CONDUCTOR SYSTEM WITH IMPROVED SPACER

Herbert Douglass Short, Newmarket, Ontario, Canada, assignor to Line and Cable Accessories Limited, Newmarket, Ontario, Canada Filed June 18, 1964, Ser. No. 376,186
2 Claims. (Cl. 174—128)

This invention relates to the provision of clamps and the like for attachment to conductors when used in a particular manner for the generation, transformation or transmission of electrical energy.

By "clamp" herein I refer to any device designed for clamping attachment to an electrical conductor.

The particular manner occurs when a plurality of separate conductors in a predetermined arrangement to one another are connected in parallel to carry the current of any one phase of an alternating current transmission circuit or the current of any one transmission element of a direct current circuit. These arrangements are usually, but not necessarily, symmetrical about a point in a plane transverse of such plurality of conductors and thus with two, three or four conductors the arrangement may be termed linear, triangular or square, respectively.

Such arrangements, and others of a plurality of conductors carrying electric currents in parallel, create potential gradients in the media between and around the separate conductors, the magnitude of which determines not only the electrical stress on the surface of the conductors but also the distribution of the electric stress on the surface of the conductors. Electrical stress greater than the electrical breakdown strength of the media between and around the conductors causes ionization of the media producing the so called "corona" and excessive corona losses. In a similar manner interference with radio and television transmission and reception is created by high frequency components of the ionization; and it has been found that the usual clamping devices are particularly prone to cause excessive interference with television and frequency modulated radio transmission and reception. The potential gradient and electrical stress may be defined and visualized by defining in the media between and around the conductors of electrosatic field flux lines and the lines of equal potential (appearing in plane transverse to the conductors as lines of equal potential).

By "equipotential lines" herein I mean such lines as equal potential normal to the electrostatic field flux lines in the media between and around a conductor (free of attachments or fittings) located in the neighbourhood of other conductors with which it is electrically connected in parallel and also free of attachments or fittings. Thus, the equipotential lines referred to herein are those which would exist before or after the attachment of the clamps or the like to which this application is directed.

By "the transverse plane" I mean a plane substantially perpendicular to each one of a group of conductors all carrying the same phase.

By "equipotential line," therefore, I means the intersection of an equipotential surface about a conductor or group thereof with a transverse plane to such conductor or group thereof.

In the drawings, which illustrate the function and a preferred embodiment of the invention:

FIGURES 1, 2 and 3 respectively illustrate the electrostatic field flux lines and the equipotential lines between and around two, three and four conductors connected in parallel, respectively, arranged symmetrically about a point when viewed in a direction transverse to the direction of the conductors;

It will be observed from the configuration of the electrostatic field flux lines in each illustration that the electric stress on the surface of the conductors is not uniformly distribute, a fact well known in the science of electrical engineering.

These figures illustrate, in connection with the conductor arrangements shown, the equipotential lines E1, E2, E3, etc. and the electrostatic field flux lines N normal thereto.

It will be seen that the equipotential lines fall into two groups, a first group enclosing one only of the grouped conductors and a second enclosing all the grouped conductors. In the arrangement shown, it will be noted that the first group in all figures approximates ellipses with the conductor approximately located at one of the foci thereof and with the longer dimension from the conductor to the equipotential line being directed toward the centre of symmetry.

It will be appreciated that when clamps or fittings not made in accordance with this invention are attached to such conductors, these will tend to distort the electrostatic field thereabout near the point of attachment. The ionization ignition electric stress is correspondingly decreased and corona losses and radio and television interference are correspondingly increased.

Accordingly it will be found that the electric stress at which ionization is initiated and also at which surfaces discharges may form is increased and that the corona losses and interference effects are conterminously decreased if such clamps or fittings are so shaped that, when clamped to a conductor, they are oriented to conform to an equipotential line thereabout which encloses one only of the conductors of the group. When a clamp is so shaped as to have its periphery in the planes transverse to the conductors conform to an equipotential line and so oriented and attached, it will be found that the electric stress on the surface of the clamp in the planes transverse to the conductors is uniform and hence the risk of a chance mechanism triggering incipient ionization and an avalanche of electrons is greatly decreased, resulting in lower corona losses and less interference with radio and television transmission and reception in comparison to clamps and fittings not so shaped or oriented.

It is an object of this invention to provide clamps and fittings for attachment to such conductors wherein the shape of such clamp is such that its limiting surfaces in the planes transverse to such attached conductors are shaped to conform to equipotential lines around said conductor, such lines being those which enclose only the attached conductor.

Figure 1:
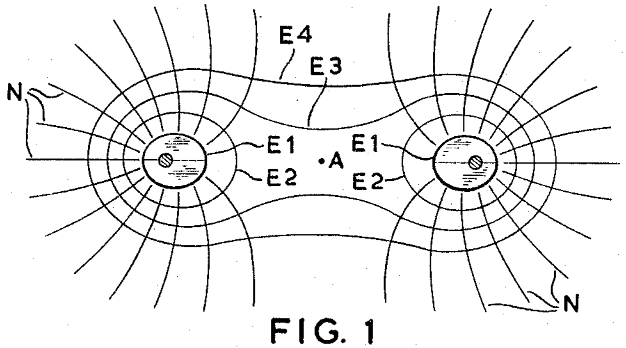
FIGURES 1 to 3 show groups of conductors connected in parallel for conducting the current in any one phase of an alternating current circuit or in the equivalent elements of a direct current circuit, held in a predetermined symmetrical relationship to each other about a point "A" in the tranverse plane by spacer means not shown.
Figure 2:
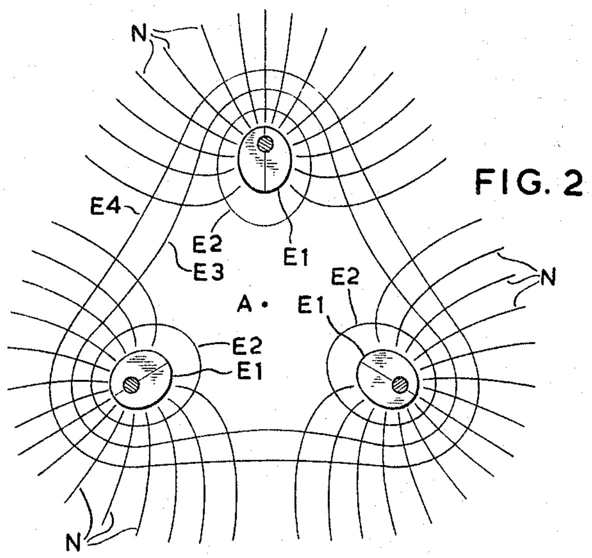
Figure 3:
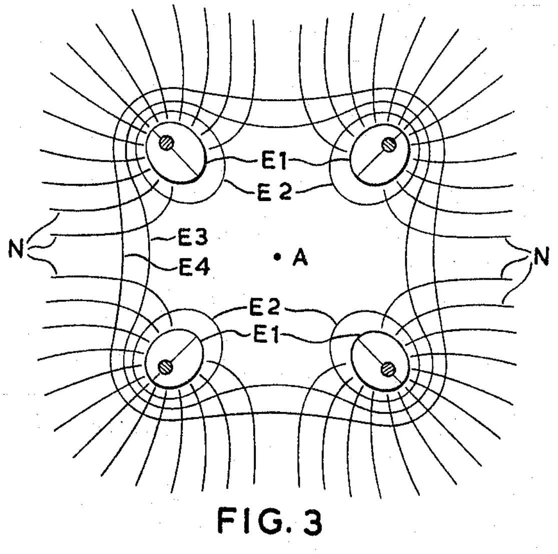

Accordingly in FIGURES 1 to 3 it will be noted that such effects will result if the clamp C is shaped to encompass the area enclosed by the inner equipotential lines. It will be realized that the potential difference between adjacent equipotential lines is arbitrarily selected, and the criterion would be that the equipotential line selected to delineate the outline of the clamp or fitting in planes transverse to the intended conductor direction would be those which enclosed only one of the conductors. Preferably, from the point of view of ease of manufacture, the equipotential lines selected would be those enclosing one conductor only and in the transverse planes approximating ellipses. The particular equipotential lines selected within the above limits would be determined by the design and manufacturing requirements of the clamp.

Figure 4:
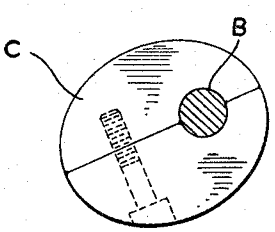
FIGURES 4 illustrates a clamp in accordance with the invention.

Such a clamp C is shown in FIGURE 4 and is provided with clamping means which may be of any one of a number of well known designs, and hence is not shown here in any detail. Such clamp C is designed to provide a predetermined bore or passage B, wherein the conductor will be received and clamped. The clamp is designed so that its outer surface will, in the planes transverse to the conductor direction, define an approximate ellipse which, for a specific plurality of symmetrically arranged conductors, and when clamped to one of those conductors, with the conductor in the bore of the clamp, in the proper orientation, approximates one or more of the equipotential lines about said conductor which encloses that conductor only.

Figure 5:
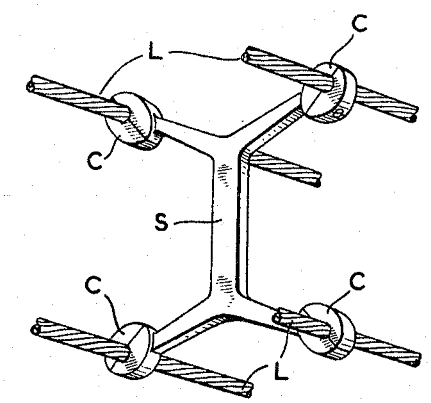
FIGURE 5 illustrates the use of such clamps.

Such clamp C, for use with a conductor spacer, are shown in FIGURE 5, where are shown four conductors L in parallel carrying the current of one phase of an alternating current circuit or that of the equivalent element of a direct current circuit.

It will be understood that the four conductors may form part of a single, three-phase or other system, and in the three-phase case would be accompanied by the other two phases, each carried by four similarly arranged conductors. As shown, the four conductors of FIGURE 5 are maintained in a square formation in the transverse plane by the spacer bar S of X form bearing at each end a clamp C for attachment of the bar to a conductor.

The clamps designed as indicated in FIGURE 4 would, on the installation of the spacer bar, be oriented to conform to the equipotential surfaces formed individually and respectively about the four conductors before attachment of such clamps, and as indicated in FIGURE 3; and then clamped to conductors. In this way, the surfaces of each clamp delineating the outline of the clamp in the transverse plane conform to what would be an equipotential line about the conductor. Thus, it will be found that corona losses and interference effects will be decreased.

Although a spacer bar is shown, it will be realized that the invention is applicable to clamps and fittings for attachment of the conductors to other equipment.

It is not intended, by the above description, to limit the invention to clamps for conductors in symmetrical arrangement, or to clamps wherein the outline of the surfaces thereof in the transverse plane are elliptical. This will be the common form.

However, in the general case, for a given arrangement of conductors connected in parallel and carrying the current of any one phase of an alternating current circuit or one of the corresponding elements of a direct current circuit, for each conductor the shape of those equipotential lines which enclose a single conductor only will be determined, and the clamp will be designed so that when clamped to the conductor for which the equipotential lines have been determined, the clamp will conform thereto.

What I claim as my invention is:

1. In an electrical transmission system wherein a plurality of conductors are supported in a bracket in parallel spaced relation by means of a conductor spacer bracket to carry the currents in the same sense and direction, the improvement in said conductor spacer bracket wherein said conductor spacer bracket has a plurality of conductor clamps, one for each of said conductors, support means for each of said conductor clamps, each of said conductor clamps having gripping surfaces adapted to support one of said conductors along a portion of its length, said clamps each having a gripping longitudinal axis that extends between and in parallel relation to said gripping surfaces adapted to align with the direction of its respective conductor, the gripping longitudinal axes of said clamps being parallel to each other, said support means supporting said clamps as aforesaid in a plane transverse to the gripping longitudinal axes of said clamps, said conductors being arranged substantially symmetrically about a point, said clamps each having a cross section with an outline taken transverse to their gripping longitudinal axes that is substantially in conformity with an equipotential surface of the current carrying conductor clamped therein.

2. In an electrical transmission system wherein a plurality of conductors are suported in a bracket in parallel spaced relation by means of a conductor spacer bracket to carry the currents in the same sense and direction, the improvement in said conductor spacer bracket claimed in claim 1, in which said outline of said cross section of each of said clamps approximates an ellipse, said gripping longitudinal axis passing through the focus of said ellipse.

References Cited by the Examiner

UNITED STATES PATENTS

| | | | |
|---|---|---|---|
| 1,198,137 | 9/1916 | Lincoln | 174—141 |
| 2,130,309 | 9/1938 | Nergaard | 174—32 |
| 3,102,161 | 8/1963 | Raisbeck | 174—127 |
| 3,121,770 | 2/1964 | Dallye | 174—146 X |

FOREIGN PATENTS

| | | |
|---|---|---|
| 653,027 | 11/1962 | Canada. |
| 939,459 | 2/1956 | Germany. |
| 724,729 | 2/1955 | Great Britain. |

LARAMIE E. ASKIN, *Primary Examiner.*

ROBERT K. SCHAEFER, *Examiner.*